Figure 1:
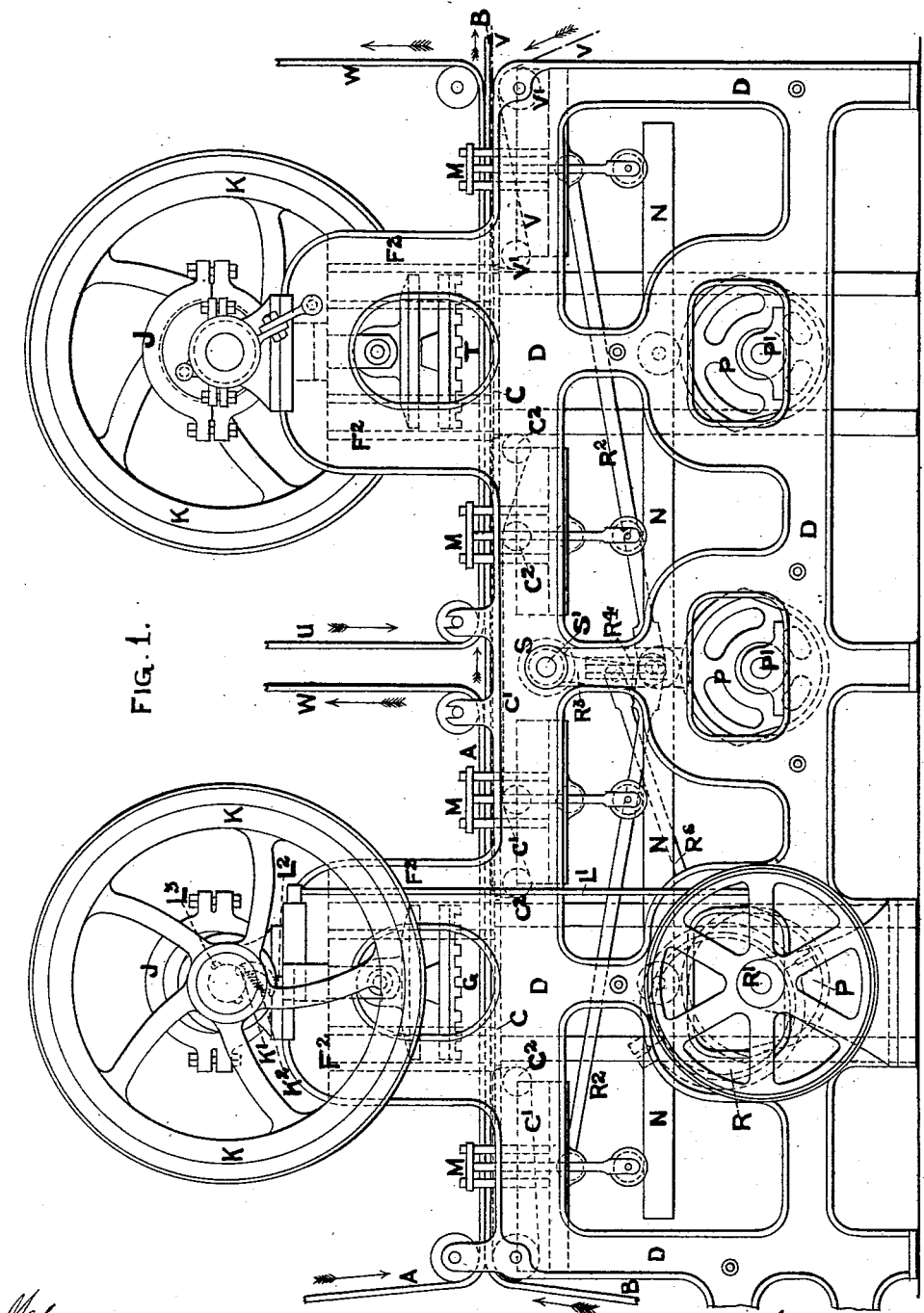

(No Model.) 6 Sheets—Sheet 1.

W. G. THOMSON.
MACHINE FOR MAKING INLAID LINOLEUM OR OTHER FLOOR CLOTHS.

No. 564,852. Patented July 28, 1896.

Witnesses:
J. Spragg Poole
Arthur S. Brown

Inventor
Wallace G. Thomson
by Herbert W. Jenner
Attorney

THE NORRIS PETERS CO., PHOTO-LITHO., WASHINGTON, D. C.

(No Model.) 6 Sheets—Sheet 3.

W. G. THOMSON.
MACHINE FOR MAKING INLAID LINOLEUM OR OTHER FLOOR CLOTHS.

No. 564,852. Patented July 28, 1896.

(No Model.)  6 Sheets—Sheet 4.

W. G. THOMSON.
MACHINE FOR MAKING INLAID LINOLEUM OR OTHER FLOOR CLOTHS.

No. 564,852. Patented July 28, 1896.

Witnesses
Abraham Reed
Willie Radley

Inventor
Wallace Galey Thomson
by Herbert W. T. Jenner
Attorney (No Model.) 6 Sheets—Sheet 5.

W. G. THOMSON.
MACHINE FOR MAKING INLAID LINOLEUM OR OTHER FLOOR CLOTHS.

No. 564,852. Patented July 28, 1896.

Witnesses:
Frank O. Gregory
J. O. Johnson

Inventor.
Wallace G. Thomson
by Herbert W. T. Jenner.
Attorney.

(No Model.) 6 Sheets—Sheet 6.

W. G. THOMSON.
MACHINE FOR MAKING INLAID LINOLEUM OR OTHER FLOOR CLOTHS.

No. 564,852. Patented July 28, 1896.

Witnesses:
Frank O. Gregory
J. O. Johnson

Inventor.
Wallace G. Thomson.
by Herbert W. T. Jenner
Attorney

UNITED STATES PATENT OFFICE.

WALLACE GALREY THOMSON, OF HALIFAX, ENGLAND.

MACHINE FOR MAKING INLAID LINOLEUM OR OTHER FLOOR-CLOTHS.

SPECIFICATION forming part of Letters Patent No. 564,852, dated July 28, 1896.

Application filed December 23, 1895. Serial No. 573,100. (No model.) Patented in England November 2, 1894, No. 21,029.

*To all whom it may concern:*

Be it known that I, WALLACE GALREY THOMSON, a subject of the Queen of Great Britain, residing at Halifax, in the county of York, England, have invented new and useful Improvements in Machines for Making Inlaid Linoleum and other Floor-Cloths, of which the following is a specification.

Letters Patent for this invention have been obtained in Great Britain, No. 21,029, dated November 2, 1894.

The object of this invention is to manufacture inlaid linoleums and other floor-cloths, so as to produce a permanent and distinct design or pattern through the piece. Hitherto methods and apparatus for obtaining this result have been constructed so that the design or colored pattern is cut or punched out of a suitable sheet passed over stencil-plates and placed upon a suitable canvas backing, such operation being continued until the whole of the backing immediately underneath is covered with such pieces, after which any ordinary method is employed for attaching and consolidating the same to the backing. This is a slow method, and the colors or patterns when the linoleum is finished are not distinct or clear. Now by my invention I pass two sheets of linoleum of different colors between suitable dies, one sheet, preferably the bottom sheet, being the groundwork. As these sheets pass between the aforesaid dies the top or male die is lowered and cuts or presses the patterns out of the said sheets and places the pattern or pieces so cut from the one sheet into the corresponding orifice cut in the other sheet forming the groundwork simultaneously and at one operation of the die. The sheets are then moved by suitable mechanism the required distance and the operation repeated.

If desired, a third, fourth, or other number of colors or patterns may be introduced by placing one or more sets of dies upon the bed of the machine.

When the desired pattern has been obtained, the linoleum passes onto a canvas sheet or backing and the two move forward to a suitable calendering-machine for attaching and finishing same.

Figure 2:
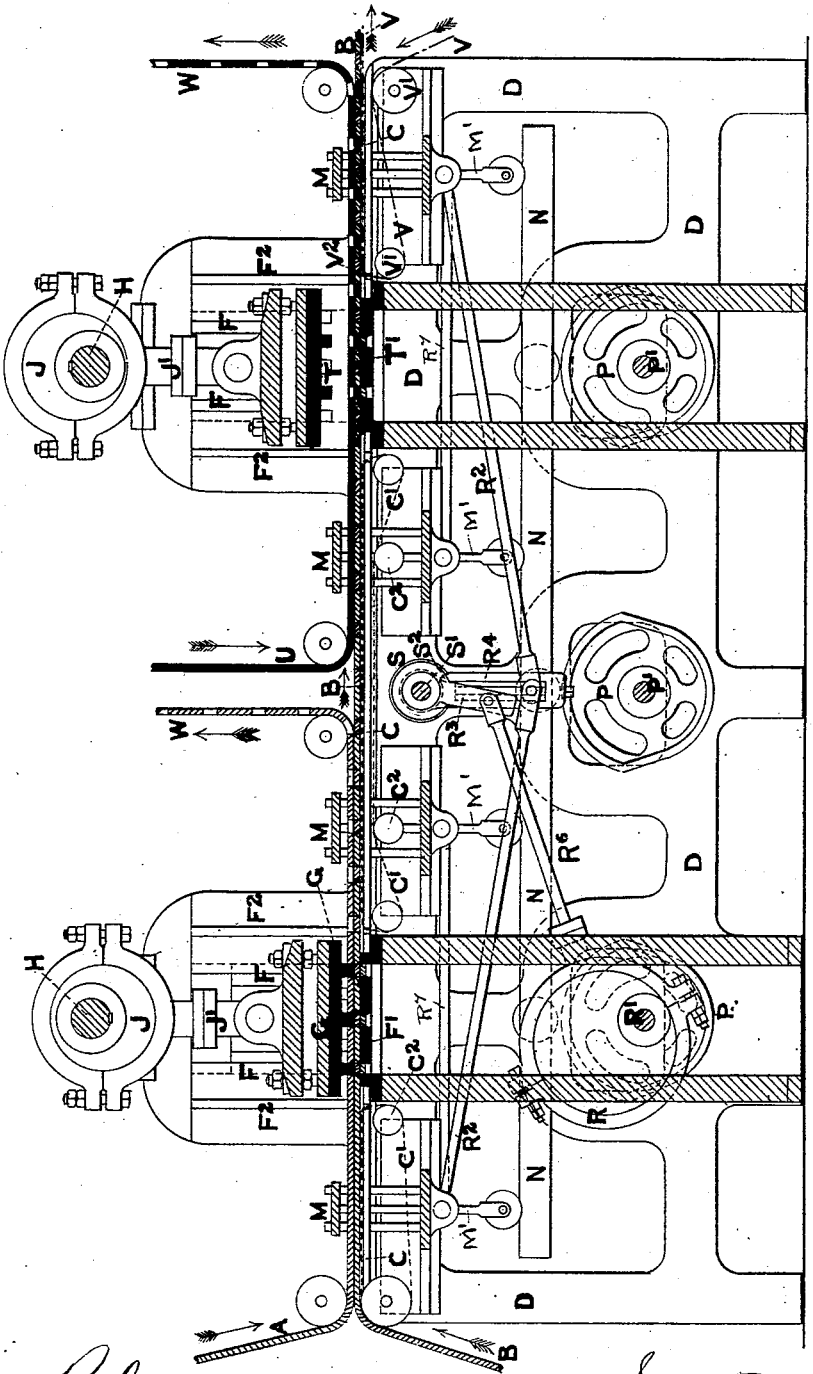
Figure 3:
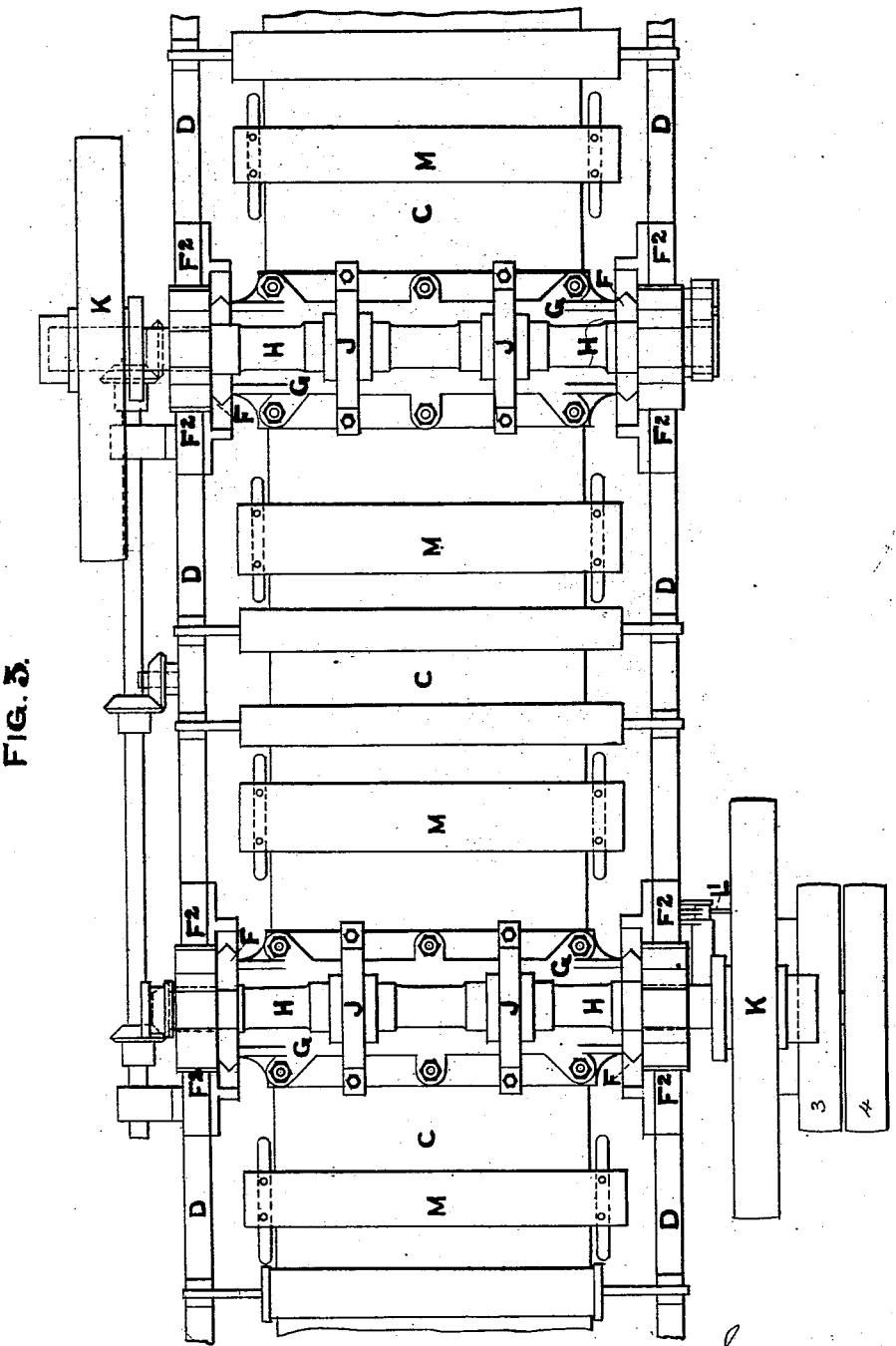
Figure 4:
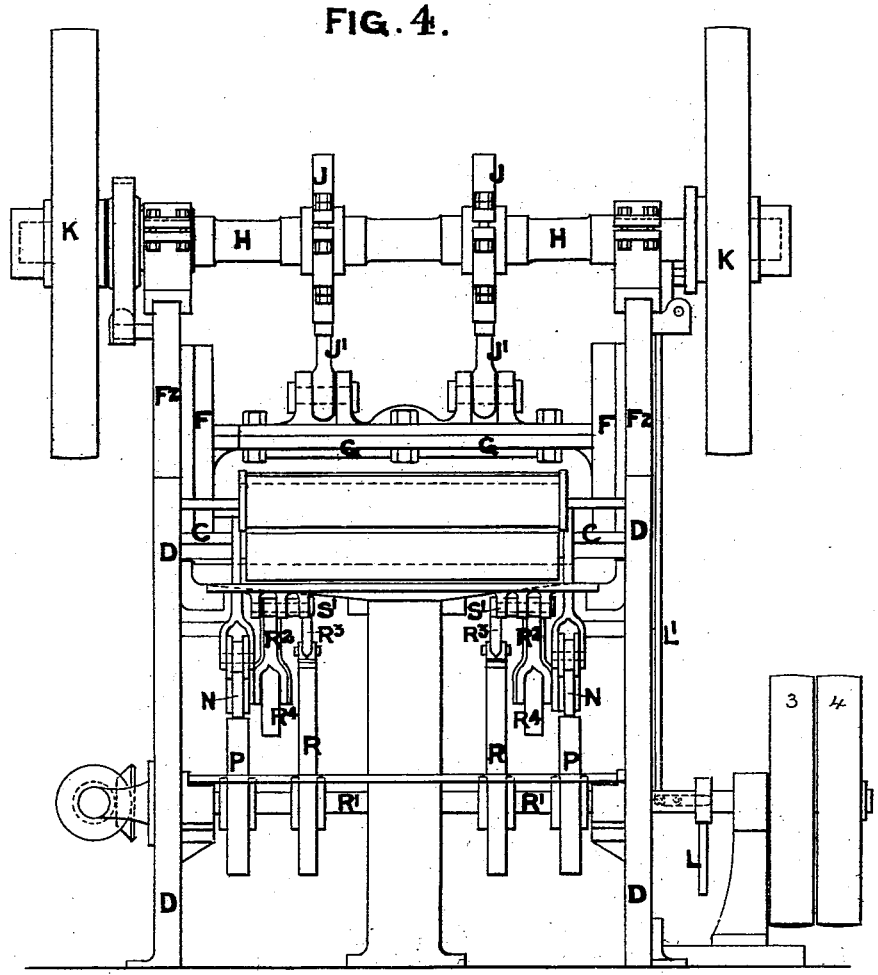
Figure 5:
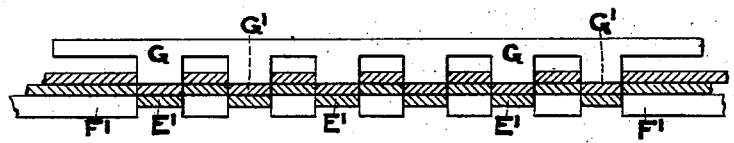
Figure 6:
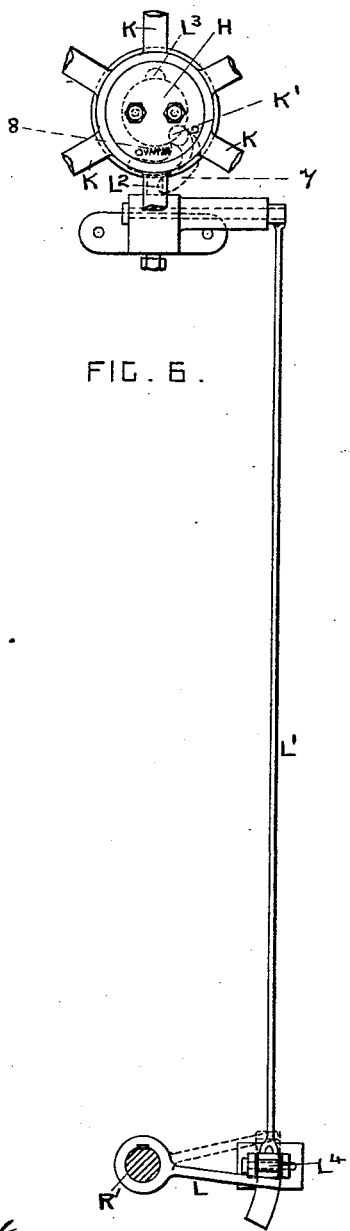
Figure 7:
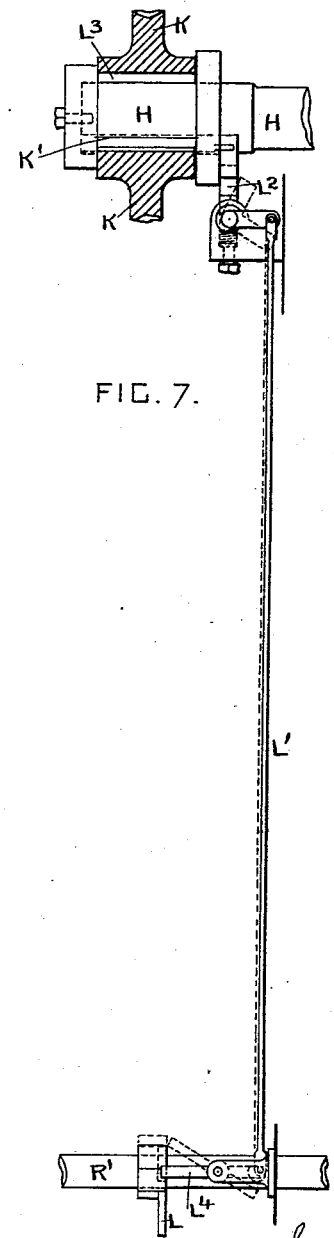
Figure 6:
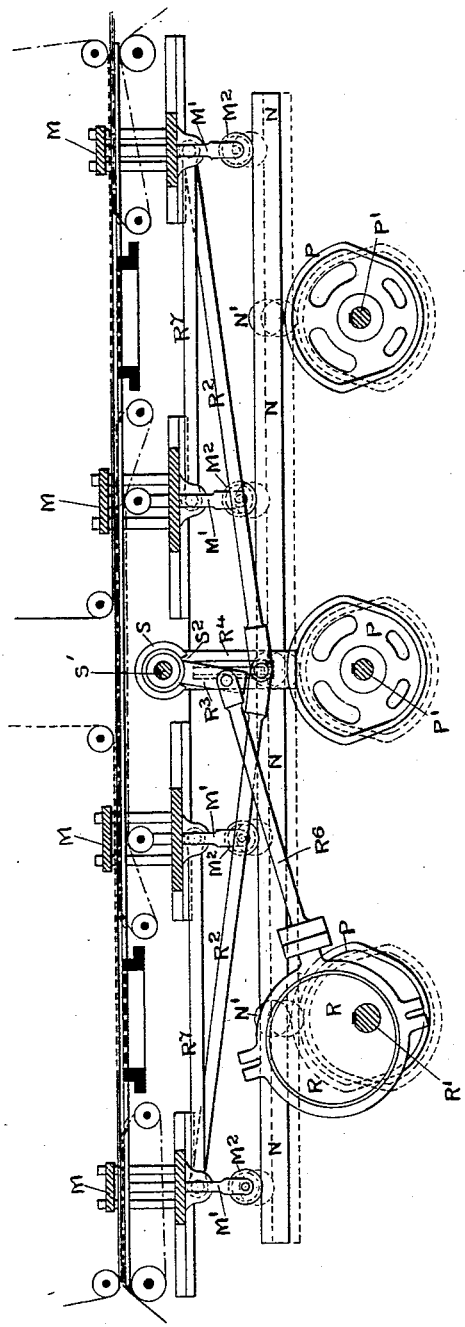

In the drawings, Figure 1 is a side elevation of my improved apparatus for manufacturing inlaid linoleums and other floor-cloths. Fig. 2 is a longitudinal section of Fig. 1. Fig. 3 is a plan view of the machine. Fig. 4 is an end view of the same. Fig. 5 is a side view of the dies, drawn to a larger scale and showing the linoleum in section. Fig. 6 is a detail front view of the devices for connecting the fly-wheel to the cross-shaft. Fig. 7 is an end view of the same, partly in section. Fig. 8 is a longitudinal section through the machine, showing the details of the mechanism for operating the gripper-plates.

The linoleum is preferably rolled in the ordinary way without a canvas back in sheets of various colors.

In manufacturing linoleum with a permanent design through the piece I employ in the first instance preferably two sheets of different colors, such sheets A B passing from suitable rollers or beams (mounted upon or over the machine-frame D) over a table or frame C and between male and female dies G and F', the male die G being carried by slides F, working in standards $F^2$ upon the machine-frame, such die G operating upon the sheets at regular intervals by means of connecting-rod J' and eccentric J upon a cross-shaft H, mounted upon the standards $F^2$.

The driving-shaft R' of the machine is provided with fast and loose pulleys 3 and 4 of approved arrangement. The cross-shaft H has a fly-wheel K journaled on it, and this fly-wheel is revolved continuously from any convenient source of power, as, for instance, by an engine and driving-belt. The fly-wheel is caused to revolve the shaft H at intervals by the mechanism shown in Figs. 6 and 7.

K' is a semicircular key journaled in a notch or groove in the shaft H. The hub of the fly-wheel normally revolves over this key, and it is provided with a semicircular keyway $L^3$, with which the said key may engage when partially revolved in the notch. The key has an arm 7 on its projecting end, and 8 is a spring connected to the arm and to the hub and operating to turn the key so that it engages with the keyway when the latter comes opposite to it.

$L^2$ is a tappet pivotally supported from the frame and normally holding the arm extended against the tension of the spring 8.

$L^4$ is a weighted lever pivotally supported by the frame, and L' is a connecting-rod pivoted to the tappet L² and to the lighter end of the lever L⁴.

L is a tappet secured on the driving-shaft R'. At each revolution of the shaft R' the tappet L raises the heavy end of the lever L⁴ and moves the tappet L² clear of the arm 7, as indicated by dotted lines in Fig. 7, and the spring 8 causes the key K' to engage with the keyway when the said keyway comes opposite to it.

When the tappet L leaves the lever L⁴, the heavy end of the said lever raises the connecting-rod and restores the tappet L² to its original position in the path of the arm 7. The arm 7 strikes the tappet L² as the shaft revolves and turns the key K' clear of the keyway, thereby uncoupling the shaft H from the fly-wheel. The shaft H operates the dies G, as hereinbefore described.

As the sheets A and B pass over and between the aforesaid dies F' and G, the slide F, carrying the die G, is operated by the mechanism before described, lowering the said die G and pressing out the bottom figure E' (see Fig. 5) of the bottom or ground sheet B and cutting out and inserting the figure or pattern G' of the top sheet A therein. The die is then raised to its original position until the tappet again operates upon the connecting-rod L'. Immediately the die G is raised gripper-plates M move the sheets forward the required distance for the next operation of the dies, these gripper-plates being raised and lowered by cams P upon the cross-shafts P' and the driving-shaft R' and moved backward and forward upon guide-rails N by means of eccentric R upon the driving-shaft R' and connecting-rods R² R⁶.

The gripper-plates M are mounted upon standards M', which are provided with rollers M² at their lower ends. These rollers run on rails N, supported one on each side of the machine. The rails N are provided with rollers N', which run upon cams P, mounted on the cross-shafts P' and the driving-shaft R', which are revolved continuously in any approved manner. As the cams revolve they raise the rails and the gripper-plates, as shown by full lines in Fig. 8.

The gripper-plates are moved longitudinally in one direction when resting on the linoleum, and are moved in the other direction when raised above it, by means of the slotted lever R⁴ and the connecting-rods R² and R⁷.

S' is a cross-shaft, and R³ is a lever journaled on the said cross-shaft and oscillated continuously by means of the eccentric R, secured on the shaft R', and the rod R⁶.

The lever R⁴ is provided with a hub S, which is journaled on the hub of the lever R³, and the hub S has a notch or slot S², which is wider than the lever R³, which projects through it. This construction causes the lever R⁴ to oscillate intermittently and the plates M to pause at the ends of their travels, and thereby permits the cams to raise the plates clear of the linoleum before they commence their return movements.

Endless aprons C' are preferably employed for preventing or greatly reducing the friction of the sheets upon the table when the gripper-plates M are moving the sheets forward. These endless aprons are mounted upon suitable rollers C² underneath the table C.

When desired to introduce a third color, pattern, or design into the fabric, a second pair of dies T and T', operating as before described, are employed, and a third sheet U of any color is passed from a roller or beam between the dies simultaneously with the bottom or ground sheet B, as before described.

When the desired pattern or design has been obtained, a canvas backing V is passed from a roller or beam mounted upon the machine-frame, over and under guide-rollers V', through a slot V² in the table C, after which it passes with the sheet of linoleum to a suitable calendering-machine, where it is pressed and finished in the ordinary manner.

The waste W of the top sheets may pass or be wound onto suitable rollers placed in any convenient position.

The action is as follows: When the aforesaid shaft H is caused to revolve, it operates the eccentrics J, which in turn operate the slides carrying the male die G, causing same to descend upon the female die F', pressing or cutting out the bottom figure, pattern, or design E' of the bottom sheet B, and simultaneously cutting and inserting the corresponding figure or pattern G' of the top sheet A therein, so forming the desired pattern through the piece simultaneously and at one operation of the dies. The die G upon effecting the aforesaid operation is at once raised and the sheets moved the required distance for a second operation of the dies by means of the gripper-plates M, operated by cams, levers, eccentrics, and connecting-rods, as before described.

The sheet of linoleum (should a third color or pattern be desired to be introduced) passes onto the dies T and T' simultaneous with a third sheet of any color, the said dies operating upon the same in the manner before described. When the pattern has been obtained, the canvas backing is added, as shown and described, after which the linoleum is ready for being pressed and finished in the ordinary manner.

By extending the machine-frame and adding to the sets of dies any number of designs or patterns or colors can be introduced. For different designs different sets of dies are employed.

I am aware that permanent designs have been produced upon linoleums and similar floor-cloths, and that dies have been used for this purpose; but

What I claim as the invention, and desire to secure by Letters Patent, is—

1. The combination, with stationary female dies, of slidable male dies, means for supporting two sheets of linoleum one above the other between the dies, and driving mechanism operating to press the male dies through the upper sheet and retract them without entering the lower sheet, thereby punching both sheets and depositing portions of the upper sheet in the body of the lower sheet, substantially as set forth.

2. The combination, with gripper-plates M for engaging with the linoleum, and rails supporting the gripper-plates; of cams for raising the said rails and gripper-plates, a pivoted lever $R^3$ and an eccentric and rod for oscillating it continuously, a lever $R^4$ journaled concentric with and engaging with the lever $R^3$ and oscillated intermittently by it, and connecting-rods operatively connecting the gripper-plates M with the lever $R^4$, substantially as set forth.

3. The combination, with a continuously-revoluble fly-wheel provided with a keyway, of a shaft H, a segmental key carried by the shaft H and provided with a spring-actuated arm at one end for causing it to engage with the said keyway, a pivoted tappet $L^2$ normally holding out the said arm against the tension of the spring, a continuously-revoluble shaft provided with a tappet L, a weighted lever arranged in the path of the said tappet L, and a connecting-rod pivoted to the lighter end of the said weighted lever and to the said tappet $L^2$, substantially as set forth.

In witness whereof I affix my signature in the presence of two witnesses.

WALLACE GALREY THOMSON.

Witnesses:
ABRAHAM REED,
WILLIE RADLEY.